(12) United States Patent
Khare et al.

(10) Patent No.: US 12,526,669 B2
(45) Date of Patent: Jan. 13, 2026

(54) NETWORK DATA ANALYTICS FUNCTION ACCURACY ENHANCEMENT

(71) Applicant: Nokia Solutions and Networks Oy, Espoo (FI)

(72) Inventors: Saurabh Khare, Bangalore (IN); Gerald Kunzmann, Munich (DE); Colin Kahn, Morris Plains, NJ (US)

(73) Assignee: Nokia Solutions and Networks Oy, Espoo (FI)

(*) Notice: Subject to any disclaimer, the term of this patent is extended or adjusted under 35 U.S.C. 154(b) by 395 days.

(21) Appl. No.: 18/165,996

(22) Filed: Feb. 8, 2023

(65) Prior Publication Data
US 2023/0262498 A1    Aug. 17, 2023

Related U.S. Application Data

(60) Provisional application No. 63/309,185, filed on Feb. 11, 2022.

(51) Int. Cl.
| | |
|---|---|
| *H04W 24/08* | (2009.01) |
| *H04L 43/06* | (2022.01) |
| *H04W 8/18* | (2009.01) |
| *H04W 24/10* | (2009.01) |

(52) U.S. Cl.
CPC .......... *H04W 24/08* (2013.01); *H04L 43/06* (2013.01); *H04W 8/18* (2013.01); *H04W 24/10* (2013.01)

(58) Field of Classification Search
CPC ....... H04W 24/08; H04W 8/18; H04W 24/10; H04L 43/06
See application file for complete search history.

(56) References Cited

U.S. PATENT DOCUMENTS

| | | |
|---|---|---|
| 2020/0358670 A1 | 11/2020 | Lee et al. |
| 2020/0358689 A1 | 11/2020 | Lee et al. |
| 2021/0021494 A1 | 1/2021 | Yao et al. |
| 2021/0037400 A1 | 2/2021 | Yao et al. |
| 2021/0076320 A1 | 3/2021 | Park et al. |

(Continued)

FOREIGN PATENT DOCUMENTS

| | | |
|---|---|---|
| EP | 4099635 A1 | 12/2022 |
| WO | 2021/172810 A1 | 9/2021 |

OTHER PUBLICATIONS

"3rd Generation Partnership Project; Technical Specification Group Services and System Aspects; Architecture enhancements for 5G System (5GS) to support network data analytics services (Release 17)", 3GPP TS 23.288, V17.2.0, Sep. 2021, pp. 1-196.

(Continued)

*Primary Examiner* — Clayton R Williams
(74) *Attorney, Agent, or Firm* — Nokia Technologies Oy (57) ABSTRACT

Systems, methods, apparatuses, and computer program products for network data analytics function (NWDAF) accuracy enhancement. A method may include selecting a network function that can provide accuracy information. The method may also include sending a request to the network function for one or more accuracy reports for one or more analytics predictions. The method may further include receiving the one or more accuracy reports from the network function. In addition, the method may include managing the one or more analytics predictions based on the one or more accuracy reports.

22 Claims, 6 Drawing Sheets

(56) References Cited

U.S. PATENT DOCUMENTS

| | | | | | |
|---|---|---|---|---|---|
| 2023/0077340 | A1* | 3/2023 | Han | | H04L 43/06 709/224 |
| 2023/0153685 | A1* | 5/2023 | Puente Pestaña | | H04L 41/16 706/12 |
| 2023/0217360 | A1* | 7/2023 | Karampatsis | | H04W 24/10 370/329 |
| 2023/0261958 | A1* | 8/2023 | Teslenko | | H04L 43/20 709/224 |
| 2023/0412513 | A1* | 12/2023 | Jin | | H04L 41/5054 |
| 2024/0073709 | A1* | 2/2024 | Karampatsis | | H04W 24/02 |

OTHER PUBLICATIONS

"Accuracy (trueness and precision) of measurement methods and results—Part 1: General principles and definitions", ISO 5725-1, First edition, Dec. 15, 1994, 11 pages.

"Accuracy and precision", Wikipedia, Retrieved on May 16, 2023, Webpage available at : https://en.wikipedia.org/wiki/Accuracy_and_precision.

"5G; Architecture enhancements for 5G System (5GS) to support network data analytics services (3GPP TS 23.288 version 16.4.0 Release 16)", ETSI TS 123 288, V16.4.0, Jul. 2020, 68 pages.

Extended European Search Report received for corresponding European Patent Application No. 23153686.3, dated Jun. 30, 2023, 10 pages.

"3rd Generation Partnership Project; Technical Specification Group Services and System Aspects; Architecture enhancements for 5G System (5GS) to support network data analytics services (Release 17)", 3GPP TS 23.288, V17.3.0, Dec. 2021, pp. 1-204.

"Term alignment of Target of Analytics Reporting and Analytics Filter Information", 3GPP TSG-WG SA2 Meeting #148E e-meeting, S2-2109074, China Mobile, Nov. 15-19, 2021, 66 pages.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

Notice of Allowance received for corresponding European Patent Application No. 23153686.3, dated Apr. 14, 2025, 7 pages.

* cited by examiner

FIG. 1

| Analytics prediction (and input data sources) | for accuracy, real data can be collected from: |
|---|---|
| UE mobility prediction (AMF, AF) | GMLC, AF, AMF |
| UE communication prediction (AMF, SMF, AF, UPF) | AF, AMF, SMF, UPF |
| UE abnormal behavior and/or Expected UE behavior (AMF, SMF, AF, OAM) | OAM, AMF, SMF, AF |
| NF load (NRF, OAM) | NRF, OAM |
| Slice Load (OAM, AMF, NSACF, NRF) | OAM, AMF, NSACF, NRF |
| QoS sustainability analytics or other etc. (OAM) | OAM |

NETWORK DATA ANALYTICS FUNCTION ACCURACY ENHANCEMENT

RELATED APPLICATIONS

This application claims the benefit of priority of U.S. Patent Application No. 63/309,185, filed on Feb. 11, 2022, which is incorporated herein by reference in its entirety.

FIELD

Some example embodiments may generally relate to mobile or wireless telecommunication systems, such as Long-Term Evolution (LTE) or fifth generation (5G) new radio (NR) access technology, or other communications systems. For example, certain example embodiments may relate to apparatuses, systems, and/or methods for network data analytics function (NWDAF) accuracy enhancement.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include selecting a network function that can provide accuracy information. The method may also include sending a request to the network function for one or more accuracy reports for one or more analytics predictions. The method may further include receiving the one or more accuracy reports from the network function. In addition, the method may include managing the one or more analytics predictions based on the one or more accuracy reports.

Other example embodiments may be directed to an apparatus. The apparatus may include at least one processor and at least one memory including computer program code. The at least one memory and computer program code may also be configured to, with the at least one processor, cause the apparatus at least to select a network function that can provide accuracy information. The apparatus may also be caused to send a request to the network function for one or more accuracy reports for one or more analytics predictions. The apparatus may further be caused to receive the one or more accuracy reports from the network function. In addition, the apparatus may be caused to manage the one or more analytics predictions based on the one or more accuracy reports.

Other example embodiments may be directed to an apparatus. The apparatus may include means for selecting a network function that can provide accuracy information. The apparatus may also include means for sending a request to the network function for one or more accuracy reports for one or more analytics predictions. The apparatus may further include means for receiving the one or more accuracy reports from the network function. In addition, the apparatus may include means for managing the one or more analytics predictions based on the one or more accuracy reports.

In accordance with other example embodiments, a non-transitory computer readable medium may be encoded with instructions that may, when executed in hardware, perform a method. The method may include selecting a network function that can provide accuracy information. The method may also include sending a request to the network function for one or more accuracy reports for one or more analytics predictions. The method may further include receiving the one or more accuracy reports from the network function. In addition, the method may include managing the one or more analytics predictions based on the one or more accuracy reports.

Other example embodiments may be directed to a computer program product that performs a method. The method may include selecting a network function that can provide accuracy information. The method may also include sending a request to the network function for one or more accuracy reports for one or more analytics predictions. The method may further include receiving the one or more accuracy reports from the network function. In addition, the method may include managing the one or more analytics predictions based on the one or more accuracy reports.

Other example embodiments may be directed to an apparatus that may include circuitry configured to select a network function that can provide accuracy information. The apparatus may also include circuitry configured to send sending a request to the network function for one or more accuracy reports for one or more analytics predictions. The apparatus may further include circuitry configured to receive the one or more accuracy reports from the network function. In addition, the apparatus may include circuitry configured to manage the one or more analytics predictions based on the one or more accuracy reports.

Certain example embodiments may be directed to a method. The method may include receiving a request at a network function from an analytics consumer for one or more accuracy reports for one or more analytics predictions. The method may also include obtaining accuracy data indicating an actual outcome of the one or more analytics predictions in response to the request. The method may further include generating the one or more accuracy reports based on the accuracy data. In addition, the method may include sending the one or more accuracy reports to the analytics consumer based on the accuracy data.

Other example embodiments may be directed to an apparatus. The apparatus may include at least one processor and at least one memory including computer program code. The at least one memory and computer program code may be configured to, with the at least one processor, cause the apparatus at least to receive a request at a network function from an analytics consumer for one or more accuracy reports for one or more analytics predictions. The apparatus may also be caused to obtain accuracy data indicating an actual outcome of the one or more analytics predictions in response to the request. The apparatus may further be caused to generate the one or more accuracy reports based on the accuracy data. In addition, the apparatus may be caused to send the one or more accuracy reports to the analytics consumer based on the accuracy data.

Other example embodiments may be directed to an apparatus. The apparatus may include means for receiving a request at a network function from an analytics consumer for one or more accuracy reports for one or more analytics predictions. The apparatus may also include means for obtaining accuracy data indicating an actual outcome of the one or more analytics predictions in response to the request. The apparatus may further include means for generating the one or more accuracy reports based on the accuracy data. In addition, the apparatus may include means for sending the one or more accuracy reports to the analytics consumer based on the accuracy data.

In accordance with other example embodiments, a non-transitory computer readable medium may be encoded with instructions that may, when executed in hardware, perform a method. The method may include receiving a request at a network function from an analytics consumer for one or more accuracy reports for one or more analytics predictions. The method may also include obtaining accuracy data indicating an actual outcome of the one or more analytics predictions in response to the request. The method may further include generating the one or more accuracy reports based on the accuracy data. In addition, the method may include sending the one or more accuracy reports to the analytics consumer based on the accuracy data.

Other example embodiments may be directed to a computer program product that performs a method. The method may include receiving a request at a network function from an analytics consumer for one or more accuracy reports for one or more analytics predictions. The method may also include obtaining accuracy data indicating an actual outcome of the one or more analytics predictions in response to the request. The method may further include generating the one or more accuracy reports based on the accuracy data. In addition, the method may include sending the one or more accuracy reports to the analytics consumer based on the accuracy data.

Other example embodiments may be directed to an apparatus that may include circuitry configured to receive a request at a network function from an analytics consumer for one or more accuracy reports for one or more analytics predictions. The apparatus may also include circuitry configured to obtain accuracy data indicating an actual outcome of the one or more analytics predictions in response to the request. The apparatus may further include circuitry configured to generate the one or more accuracy reports based on the accuracy data. In addition, the apparatus may include circuitry configured to send the one or more accuracy reports to the analytics consumer based on the accuracy data.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for NWDAF accuracy enhancement.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

$3^{rd}$ Generation Partnership Project (3GPP) describes that a consumer requesting analytics can specify a preferred accuracy level (e.g., low, medium, high, or highest), and the NWDAF can provide a probability assertion expressing the confidence in its predictions. The probability assertion may be provided to the consumer with the analytics prediction(s) as part of the analytics report, and does not compare provided predictions with actual future outcomes (which have yet to occur).

Accuracy can be described as an aspect of artificial intelligence/machine learning (AI/ML). Accuracy may differ from the confidence level available in NWDAF application programming interfaces (APIs). For example, accuracy may provide an indication of how well the actual outcome matched a prediction, and may be provided as a function of confidence. However, currently, there is no standardized way for the NWDAF to have knowledge of the accuracy information. For instance, the NWDAF may predict something for the future, but when the actual event occurs, the NWDAF does not monitor/collect data related to this event for a comparison with its previous predictions. However, in some cases, monitored/collected data may be used internally in the NWDAF to improve its predictions.

Similarly, consumers requesting analytics of the type "prediction" from an NWDAF, may be provided with an analytics output/prediction with a confidence estimated by the NWDAF implementation logic. In certain example embodiments, there may be a single analytics request resulting in a single analytics report, or there may be a subscription to receive analytics reports. However, in such a scenario, the analytics consumer is unable to retrieve an accuracy report related to the prediction or related to earlier predictions performed for the same analytics type and model used (i.e., an accuracy indication derived from comparing the actual outcome with a previously predicted value).

According to certain example embodiments, if the NWDAF determines an actual outcome, for example the location or communication activity of a UE, or network function or network slice load which were previously predicted, then it may send an accuracy report of the outcome to the consumer so that the consumer can compare the outcome with a previously provided prediction. Alternatively, the NWDAF may compare the outcome with a previous prediction to generate an accuracy report, which the NWDAF may provide to the consumer.

In certain example embodiments, the consumer may fine-tune an ongoing or future analytics request/subscription (e.g. a prediction request). For example, if a network function (NF) or application function (AF) has requested periodic user equipment (UE) location predictions from the NWDAF, the NWDAF may periodically provide prediction information as analytics notifications. For each prediction sent by the NWDAF, the NWDAF may also provide accuracy information indicating how close a prior prediction was to the actual outcome and/or indicating information about the actual outcome of the prior prediction (e.g., actual outcome such that the consumer can use this information, for example, to make the comparison by itself). In some example embodiments, the accuracy information may be provided in the same or in a different notification with the actual location of the UE. In other example embodiments, the NWDAF may also provide the accuracy information with an indication of whether the UE was in a predicted location. If, for example, the prediction information and accuracy information do not match, then the NF or AF may decide to terminate the subscription towards the NWDAF. In this case the subscription may be the means by which the NF or AF has requested analytics from the NWDAF, for example using the Nnwdaf_AnalyticsSubscription Service defined by 3GPP. Additionally, the NWDAF may tune its model for creating predictions based on the accuracy information, e.g., by triggering a re-training of the model.

According to certain example embodiments, the NWDAF may continue to collect new data after a prediction has been made so that it can learn about actual outcomes, compare them with the predicted data (which was previously generated by the analytics function), and generate the accuracy report. According to some example embodiments, the accuracy report may include the accuracy information for a given analytics subscription or for a given analytics identifier (ID) (e.g., average overall subscriptions for that analytics ID). According to certain example embodiments, when an NF wants analytics, it can send the NWDAF a subscription, which may indicate periodic reporting. As a result, one or more notifications containing the requested analytics may be sent to the NF by the NWDAF. If accuracy information is given for an analytics identifier, the accuracy information may also be provided for a given Analytics Filter Information and/or a Target of Analytics Reporting (e.g. average overall subscriptions for that analytics ID in a specific Tracking Area and/or for a group of UEs). According to other example embodiments, the accuracy report may provide the actual outcomes, or information on how the outcomes deviate from the predicted values. This may enable the network function consumer (NFc) to compare the predictions with the actual value(s), and enable the NFc to use this correct value(s) for its internal logic. According to certain example embodiments, the NFc may correspond to a function in the 5GC such as, for example, an access and mobility management function (AMF), session management function (SMF), policy control function (PCF), application function (AF), network exposure function (NEF), network slicing selection function (NSSF), etc. The NFc may also correspond to the OAM as an analytics consumer.

In certain example embodiments, the NWDAF may use accuracy information to further fine-tune the model it is using (e.g., request model re-training, and/or adjust data sources for the model training and the analytics generation). In some example embodiments, the NWDAF may use accuracy information as a trigger to re-train the model.

In some example embodiments, the NFc may use the accuracy report provided by the NWDAF to manage the subscription. For example, the NFc may use the accuracy information to terminate the subscription if accuracy is insufficient for its requirements, adjust subscription parameters or change the NWDAF, and/or take the actual accuracy into account into local decision making (e.g., adjust the weight of the analytics reports in the decision making compared to other inputs, for example, if the NFc receives NWDAF UE location predictions that are insufficiently accurate, the NFc may meet its needs by relying more heavily on UE location information provided by other sources).

According to certain example embodiments, the NWDAF may register its measured accuracy (per analytics ID) in its NF profile in a network repository function (NRF) and/or unified data manager (UDM) so that analytics consumers can use this information when selecting the NWDAF instance/set. According to some example embodiments, the NWDAF may provide a new service where the NFc can collect a detailed accuracy report from the NWDAF. For example, the detailed accuracy report may provide information on how well the NWDAF performed for a specific analytics ID using a specific model for a specific area/slice/ (group of) UE in a given time window. According to other example embodiments, when an aggregated accuracy is provided (e.g., for all subscriptions to an analytics ID), the accuracy reports may be provided as a function of the prediction confidence level (probability assertion). For instance, if a NWDAF makes a prediction indicating low confidence, meaning the NWDAF has low confidence in its prediction, a lower accuracy may be expected as compared to when the NWDAF makes a prediction indicating high confidence. Such results may be reflected in the accuracy reports, and these concepts may be applied to management data analytics service (MDAS)/management data analytics function (MDAF) or any other AI/ML engine in telecom network.

Figure 1:
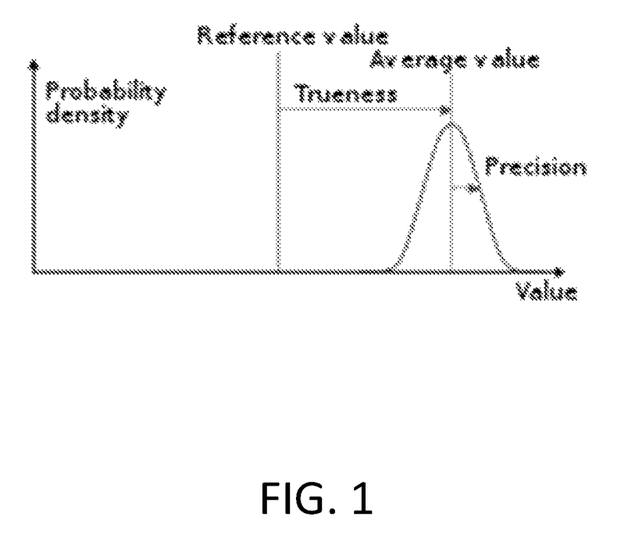
FIG. 1 illustrates an example graphical representation of the accuracy of analytics predictions, comprising trueness and precision.

FIG. 1 illustrates an example graphical representation of the accuracy of analytics predictions, comprising trueness and precision. As illustrated in the example of FIG. 1, the accuracy of the analytics predictions may correspond to the degree of closeness of predictions of a quantity (as indicated by the average value of a probability distribution in FIG. 1) to that quantity's true value (as indicated by the "Reference Value" in FIG. 1). In the case of analytics predictions, the true value may be considered a measured value.

According to certain example embodiments, the NFc may perform certain operations. For instance, in some example embodiments, when the NFc is discovering a NWDAF instance/set for an analytics ID, the returned NWDAF profile may include information about the measured accuracy for the analytics ID. In certain example embodiments, the information may include a simple average value, accuracy as a function of NWDAF reported prediction confidence, or more detailed information about the accuracy derived for previous analytics reports. According to some example embodiments, when the NFc is interested in the accuracy report along with the analytics (prediction) report, the NFc may send a request (e.g., Nnwdaf_AnalyticsSubscription_Subscribe request) to the NWDAF. The request may include information (e.g., a flag) indicating that the accuracy report is required and information on the expected type of the accuracy report (e.g. (average) accuracy value and/or returning information on the actual outcome). The NFc may also provide a callback uniform resource identifier (URI) to receive the accuracy report.

In certain example embodiments, the NWDAF supporting accuracy report may also register in the NRF that it supports the accuracy report capability. Based on the information of the NWDAF NF profile, the NFc may select the NWDAF that supports accuracy reports. In some example embodiments, the NFc may also send instructions to the NWDAF to handle the subscription after generating the accuracy report. In certain example embodiments, the instructions may be sent in an initial subscription, or in a notification response. According to certain example embodiments, the instructions may specify that if at least a certain number of consecutive predictions (e.g., 3) are wrong, the NWDAF subscription may be terminated, and a termination notification may be sent by the NWDAF to the NFc once termination is complete. Alternatively, in some example embodiments, the subscription may also be transferred to another NWDAF based on the accuracy report.

According to certain example embodiments, the NFc may send separate processing and filtering instructions to the NWDAF for the accuracy report. The separate processing and filtering instructions may be to instruct the NWDAF to club or filter the accuracy reports, where clubbing puts several accuracy reports into a single message, and filtering may modify or combine the contents of several accuracy reports to create a summary. In other example embodiments, the NFc may also request the NWDAF to receive a detailed accuracy report from the NWDAF, where the detailed accuracy report, for example, indicates how well the NWDAF performed for a specific Analytics ID, using a specific model, for a specific area/slice/(group of) UE, in a given time window. Additionally, in some example embodiments, the NFc may request aggregated (e.g., per analytics ID) accuracy information, optionally as a function of a NWDAF determined prediction confidence level.

In certain example embodiments, the NWDAF may collect new types of data for generating an accuracy report. In other example embodiments, if an NFc has requested an accuracy report(s), or the NWDAF is configured to determine accuracy (e.g., for self-improvement), the NWDAF may collect the accuracy data. According to some example embodiments, the accuracy data may correspond to the actual measured data observed at the time for which the prediction had been made. In addition, the accuracy data may be collected from different sources, and not necessarily limited to the data sources used as input data sources for generating the analytics prediction (e.g., NWDAF may use information from AMF to predict the UE location, while it uses information from LMF to retrieve the actual UE location at the time of the prediction).

Figure 2:
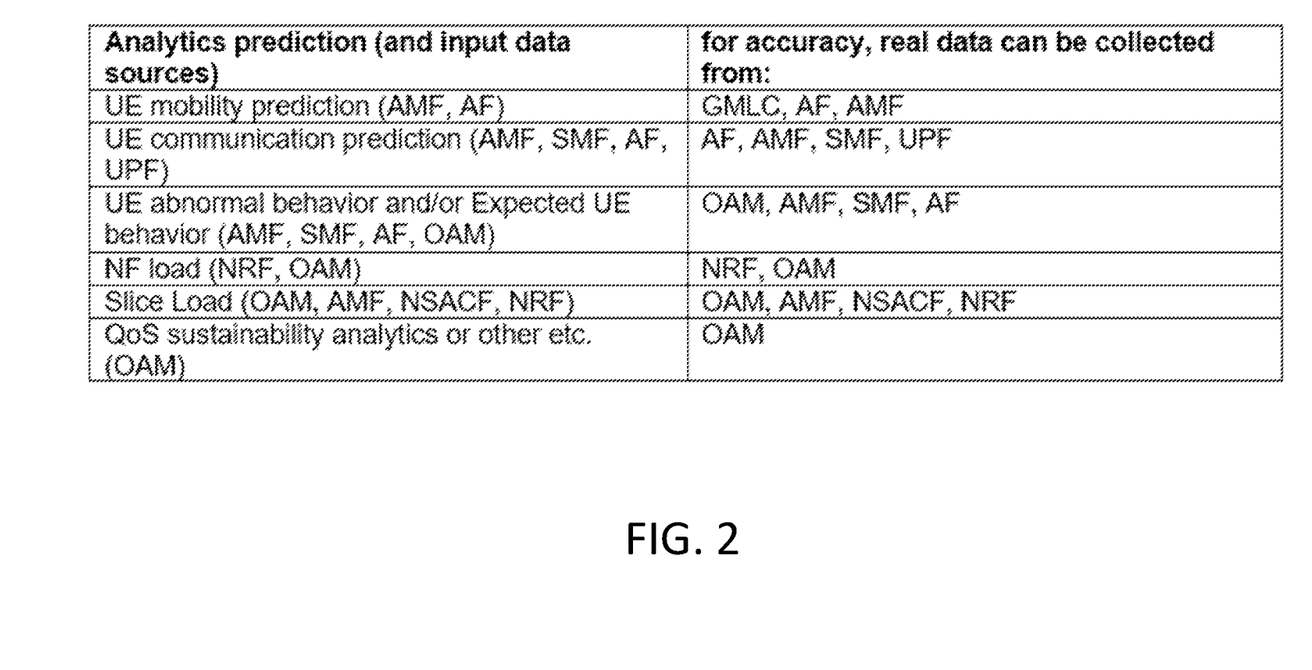
FIG. 2 illustrates an example table defining related real data collection for accuracy from the network function (NF)/operations, administration and maintenance (OAM) for some analytics and their input data sources, according to certain example embodiments.

FIG. 2 illustrates an example table defining related real data collection for accuracy from the network function (NF)/operations, administration and maintenance (OAM) for some analytics and their input data sources, according to certain example embodiments. In particular, the first column in FIG. 2 illustrates examples of what is predicted (e.g., UE mobility) and the sources of data for making those predictions (e.g., AMF, AF, etc.). Further, the second column in FIG. 2 illustrates after-the-fact data indicating the actual outcome that can be obtained. In some example embodiments, the accuracy data may be determined by comparing a UE predicted location at a time T (or between time T1 to T2) with the real location measured at time T (or between time T1 and T2). Thus, the NWDAF may collect the actual location of the user from a gateway mobile location center (GMLC) at time T (or between time T1 to T2). In other example embodiments, the accuracy data may be determined by comparing a predicted load of an NF at time T (or between time T1 to T2) with the real load measured at time T (or between time T1 and T2). For instance, the value of the predicted load may be 60%. Thus, the NWDAF may collect the real load of the NF from the NRF at time T (or average real load between time T1 to T2). Additionally, in certain example embodiments, the accuracy data may be determined by comparing a predicted network performance of the NF/gNB at time T (or between time T1 and T2), which may be on average 90% where gNBs are up and running, with the real network performance measured at time T (or between time T1 and T2). As such, the NWDAF may also collect real data (i.e., actual data or measured value) from the OAM at time T (or between time T1 to T2). In some example embodiments, the accuracy data may not be directly available in the form as needed by the NWDAF or the consumer. Thus, the NWDAF may process the accuracy data by tuning the data (i.e., using formatting and processing techniques such as those defined by 3GPP in TS23.288 clause 5A.4) to be able to generate the accuracy report.

According to certain example embodiments, the NWDAF may consume and generate accuracy reports. For example, the NWDAF (with analytics function) may use an accuracy report for self-improvement, and enhance the machine learning (ML) model used for making predictions accordingly by, for example, requesting ML model (re-)training to the model provider (i.e., NWDAF model training logical function (MTLF)). According to some example embodiments, the NWDAF may decide to terminate or modify the consuming NF (NFc) subscription based on the accuracy report. For instance, if an instruction is given to terminate the subscription if at least a certain number (e.g., 3) of consecutive accuracy reports are below a given threshold (e.g., "no match"), then the NWDAF shall terminate the subscription. In other example embodiments, if an instruction is given to suspend the notification to the NFc if the accuracy is below a given threshold, for example a threshold provided by NFc or configured on the NWDAF, the NWDAF may suspend notifications until the accuracy is (back) above the threshold. The threshold may be specified in accordance with the units of reported accuracy. For example, if the accuracy is specified as a percentage (predicted value/actual value*100), then the threshold may also be specified as a percentage. In this case, the NWDAF may send a respective error notification to the analytics consumer if the accuracy is below a given threshold.

In certain example embodiments, based on instructions received from the NFc, the NWDAF may send an accuracy report to the consumer (e.g., NFc) after the events needed for the verification of predictions have occurred. For example, the NWDAF may send a separate notification to the NFc, or the accuracy report may be clubbed with the next notification sending predictions of future events. In other example embodiments, the NFc may also inform the NWDAF to stop sending the analytics reports and to terminate the analytics subscription after the last accuracy report has been provided.

According to certain example embodiments, the frequency of the accuracy notification (which may contain accuracy reports) may be controlled via separate filtering or reporting instruction given by the NFc in the subscribe request. According to other example embodiments, the NWDAF may offer a new service to provide accuracy reports to the NFc. For example, the new service may provide detailed accuracy reports that relate to how well the NWDAF performed for a specific analytics ID, using a specific model, for a specific area, slice, or (group of) UE in a given time window.

In certain example embodiments, the NFc may take certain actions based on the received accuracy report from the NWDAF. For example, the NFc (e.g. NF/AF/OAM) may request periodic UE location prediction from the NWDAF, and the NWDAF may periodically provide prediction information in notifications to the NFc. According to certain example embodiments, for each prediction sent by the NWDAF, the NWDAF may also provide accuracy information with the actual location of the UE, or an indication if the UE was in the predicted location. If the prediction information and accuracy information do not match, then the NFc may update (e.g., terminate or transfer to another NWDAF) the subscription towards the NWDAF.

Figure 3:
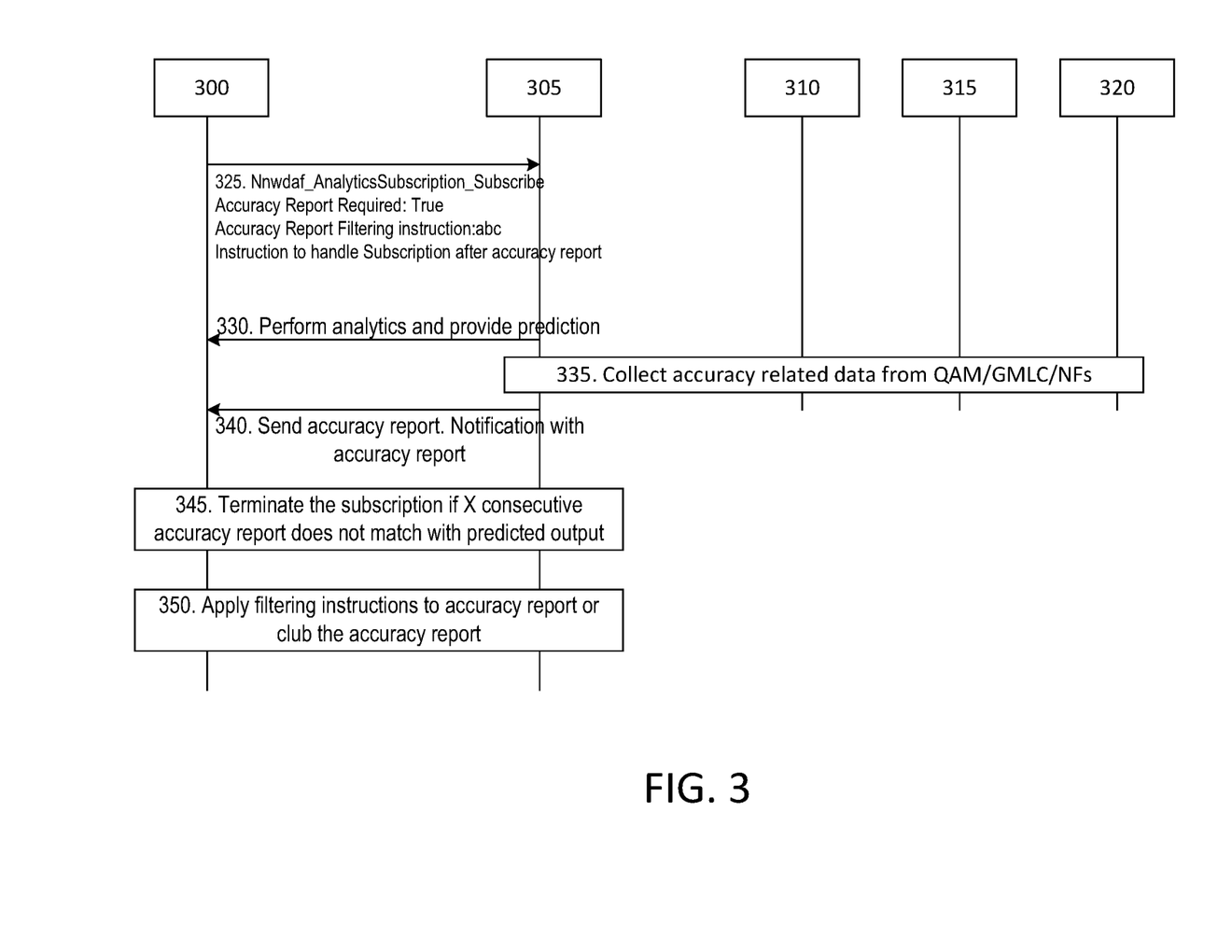
FIG. 3 illustrates an example signal flow diagram, according to certain example embodiments.

FIG. 3 illustrates an example signal flow diagram, according to certain example embodiments. In the example signal flow diagram of FIG. 3, at 325, element 300 (e.g., NFc) may send a Nnwdaf_AnalyticsSubscription_Subscribe request to element 305 (e.g., NWDAF, or any AI/ML engine). In response, at 330, element 305 may perform analytics functions and provide an analytics report (including a prediction) to the NFc. Additionally, at 335, element 305 may collect accuracy related data from elements 310, 315, and 320 (e.g., OAM/GMLC/NFs, respectively), and, at 340, create an accuracy report based on the collected data. Further, at 340, based on the instructions received from element 300, element 305 may send the accuracy report to element 300 in a notification. Additionally, at 345, element 305 may, based on the instructions received from element 300, terminate the subscription if at least a certain number of consecutive accuracy reports did not match with the predicted output. At 350, element 305 may also, based on the instructions received from element 300, apply different filtering and processing of the accuracy report.

Figure 4:
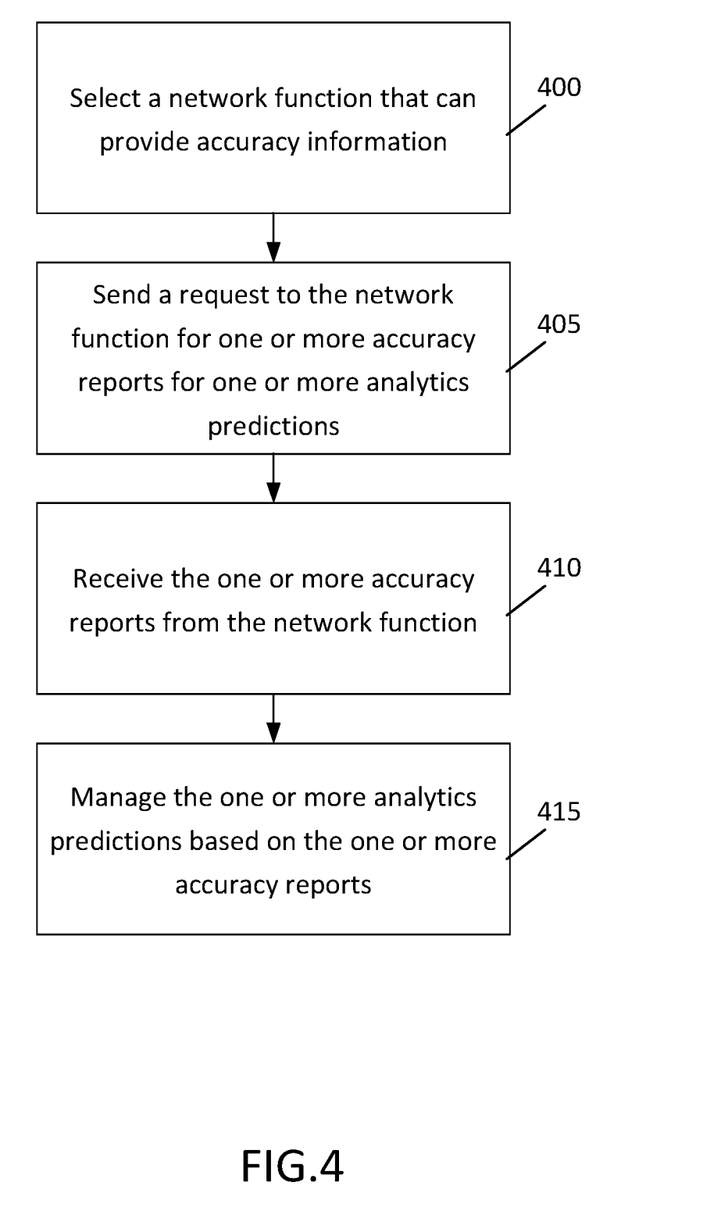
FIG. 4 illustrates an example flow diagram of a method, according to certain example embodiments.

FIG. 4 illustrates an example flow diagram of a method, according to certain example embodiments. In an example embodiment, the method of FIG. 4 may be performed by a network entity, or a group of multiple network elements in a 3GPP system, such as LTE or 5G-NR. For instance, in an example embodiment, the method of FIG. 4 may be performed by a UE or NFc similar to one of apparatuses 10 or 20 illustrated in FIG. 6.

According to certain example embodiments, the method of FIG. 4 may include, at 400, selecting a network function that can provide accuracy information. In certain example embodiments, the profile may include accuracy information. In some example embodiments, the selection of the network function may be based at least on the accuracy information. According to certain example embodiments, one selection criterion can be the accuracy information included in the profile and/or whether the network function supports providing accuracy reports. In some example embodiments, the one or more accuracy reports or accuracy information may be retrieved directly from the network function. In other example embodiments, the accuracy information may be retrieved from the profile. Further, at 405, the method may include sending a request to the network function for one or more accuracy reports for one or more analytics predictions. In addition, at 410, the method may include receiving the one or more accuracy reports from the network function. In certain example embodiments, the request and the instruction may be sent to the network in the same message. At 415, the method may include managing the one or more analytics predictions based on the one or more accuracy reports.

According to certain example embodiments, managing the one or more analytics predictions may be one or more of managing a subscription for analytics predictions and managing the use of analytics predictions. According to some example embodiments, the method may further include sending an instruction to the network function on how to handle the subscription. According to other example embodiments, the request for the one or more accuracy reports may include instructions specifying one or more conditions for the network function to terminate a subscription for analytics and stop sending accuracy reports, or to transfer a subscription for analytics and to transfer the request for the one or more accuracy reports to another network function. In certain example embodiments, the one or more conditions may include at least a certain number or percentage of the one or more accuracy reports are below a given threshold, or when accuracy of the one or more accuracy reports is below a given threshold. According to further example embodiments, the one or more accuracy reports may include at least one of information indicating the accuracy of a prior prediction. In certain example embodiments, the at least one of information indicating the accuracy of a prior prediction or the actual outcome of the prior prediction may be for at least one of location information of a user equipment, predicted load information of the network function, predicted network performance, network slice load level, observed service experience of a UE or group of UE or any UE in a network slice, UE communication activity, expected UE behavior, abnormal UE behavior, user data congestion, QoS sustainability, UE dispersion (data volume, session transmissions, etc.), WLAN performance, redundant transmission experience analytics, and data network performance. According to other example embodiments, the request to the network function for the one or more accuracy reports may further include a request for analytics.

In certain example embodiments, the method may further include sending processing and filtering instructions to the network function to club together or filter the one or more accuracy reports. In further example embodiments, the method may also include sending processing and filtering instructions to the network function to control a frequency of an accuracy notification. In some example embodiments, the one or more accuracy reports may be an aggregated report including at least one of aggregated accuracy information of a plurality of subscriptions, and aggregated accuracy information based on a plurality of comparisons between prior predictions with data indicating the actual outcome related to a single subscription. In other example embodiments, the method may further include sending instructions to the network function to stop sending analytics reports and to terminate a subscription for analytics after a last accuracy report has been received, or to transfer a subscription for analytics and to transfer the request for the one or more accuracy reports to another network function.

Figure 5:
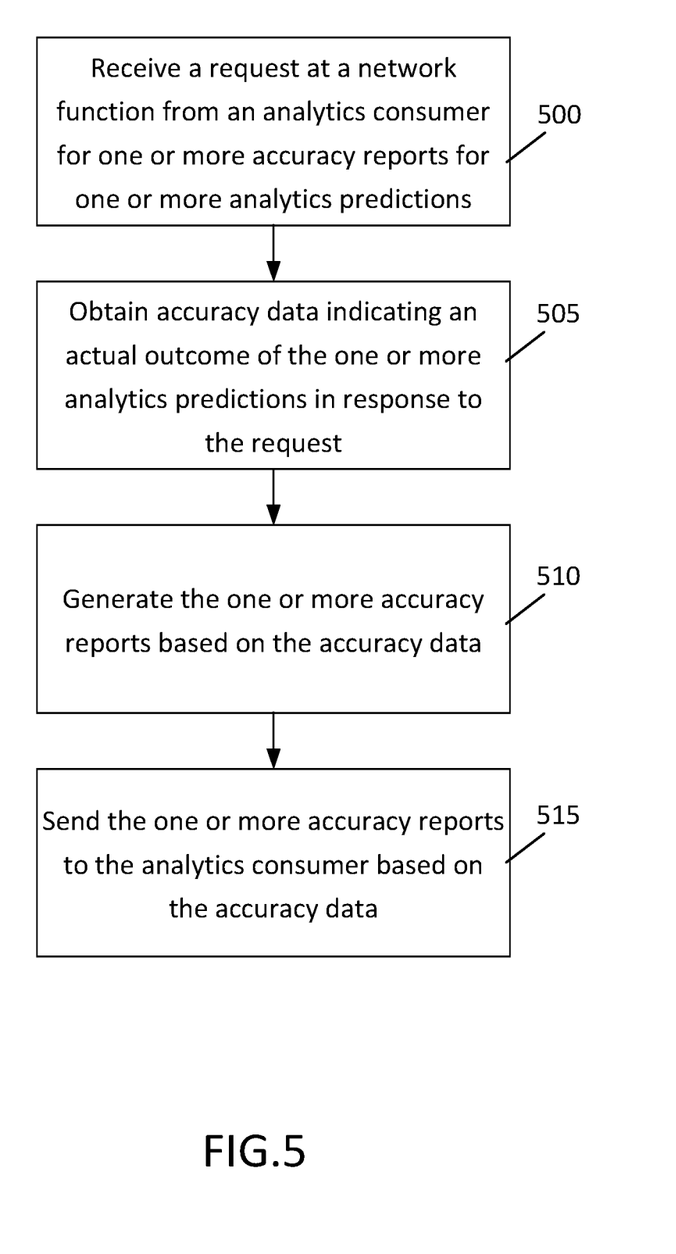
FIG. 5 illustrates an example flow diagram of another method, according to certain example embodiments.

FIG. 5 illustrates an example of a flow diagram of another method, according to certain example embodiments. In an example embodiment, the method of FIG. 5 may be performed by a network entity, or a group of multiple network elements in a 3GPP system, such as LTE or 5G-NR. For instance, in an example embodiment, the method of FIG. 5 may be performed by a gNB, NWDAF, or network function producer (NFp) similar to one of apparatuses 10 or 20 illustrated in FIG. 6.

According to certain example embodiments, the method of FIG. 5 may include, at 500, receiving a request at a network function from an analytics consumer for one or more accuracy reports for one or more analytics predictions. Further, at 505, the method may include obtaining accuracy data indicating an actual outcome of the one or more analytics predictions in response to the request. In addition, at 510, the method may include generating the one or more accuracy reports based on the accuracy data. At 515 the method may include sending the one or more accuracy reports to the analytics consumer based on the accuracy data.

According to certain example embodiments, the method may also include managing the one or more analytics predictions based on the one or more accuracy report. According to some example embodiments, the method may further include storing accuracy information based on the one or ore accuracy reports in a profile of the network function. According to other example embodiments, managing the one or more analytics predictions may be one or more of managing the subscription for analytics predictions and managing the use of analytics predictions.

In certain example embodiments, the request for the one or more accuracy reports may also include a subscription for analytics predictions. According to other example embodiments, the request for the one or more accuracy reports may include instructions specifying one or more conditions to terminate a subscription for analytics and stop sending accuracy reports, or to transfer a subscription for analytics and to transfer the request for the one or more accuracy reports to another network function. In some example embodiments, the subscription may be terminated when at least a certain number (e.g., three) or percentage of the one or more accuracy reports are below a given threshold, or when accuracy of the accuracy report is below a given threshold. In other example embodiments, the one or more accuracy reports may include at least one of information indicating the accuracy of a prior prediction or the actual outcome of a prior prediction. In some example embodiments, the percentage can be "x %" of accuracy reports. In certain example embodiments, the at least one of information indicating the accuracy of a prior prediction or the actual outcome of a prior prediction may be for at least one of location information of a user equipment, predicted load information of the network function, predicted network performance, network slice load level, observed service experience of a UE or group of UE or any UE in a network slice, UE communication activity, expected UE behavior, abnormal UE behavior, user data congestion, QoS sustainability, UE dispersion (data volume, session transmissions, etc.), WLAN performance, redundant transmission experience analytics, and data network performance.

In certain example embodiments, the method may also include receiving processing and filtering instructions from the analytics consumer to club together or filter the one or more accuracy reports. In some example embodiments, the method may further include receiving instructions to stop sending analytics reports and to terminate a subscription for analytics after a last accuracy report has been received, or to transfer a subscription for analytics and to transfer the request for the one or more accuracy reports to another network function. In other example embodiments, the method may also include controlling a frequency of an accuracy notification via a separate filtering or reporting instruction received in the request. In further example embodiments the method may further include collecting data of actual outcomes related to analytics predictions, and performing, with the collected data and predictions, self-improvement functions and machine learning operations. Further, in certain example embodiments, the method may include re-training one or more models using the accuracy data.

Figure 6:
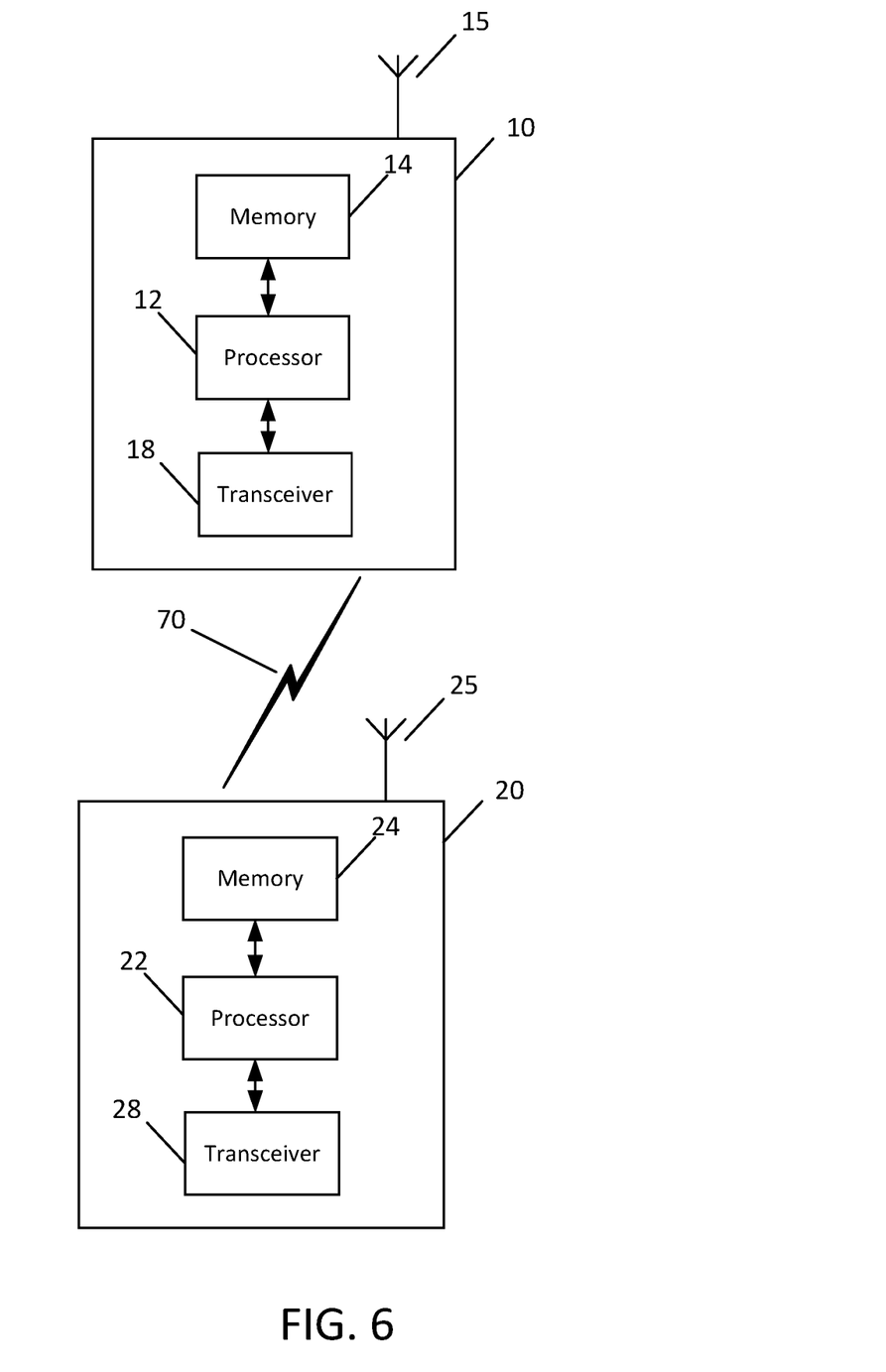
FIG. 6 illustrates a set of apparatuses, according to certain example embodiments.

FIG. 6 illustrates a set of apparatus 10 and 20 according to certain example embodiments. In certain example embodiments, the apparatus 10 may be a node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 6.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 6.

As illustrated in the example of FIG. 6, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 6, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to select a network function that can provide accuracy information. In some example embodiments, the profile may include accuracy information. In other example embodiments, the selection of the network function may be based at least on the accuracy information. Apparatus 10 may also be controlled by memory 14 and processor 12 to send a request to the network function for one or more accuracy reports for one or more analytics predictions. Apparatus 10 may further be controlled by memory 14 and processor 12 to receive the one or more accuracy reports from the network function. Further, apparatus 10 may be controlled by memory 14 and processor 12 to manage the one or more analytics predictions based on the one or more accuracy reports.

As illustrated in the example of FIG. 6, apparatus 20 may be a node, core network element, or element in a communications network or associated with such a network, such as a NWDAF, gNB, or NFp. It should be noted that one of ordinary skill in the art would understand that apparatus 20 may include components or features not shown in FIG. 6.

As illustrated in the example of FIG. 6, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-3 and 5.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-3 and 5.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to receive a request at a network function from an analytics consumer for one or more accuracy reports for one or more analytics predictions. Apparatus 20 may also be controlled by memory 24 and processor 22 to obtain accuracy data indicating an actual outcome of the one or more analytics predictions in response to the request. Apparatus 20 may further be controlled by memory 24 and processor 22 to generate the one or more accuracy reports based on the accuracy data. Further, apparatus 20 may be controlled by memory 24 and processor 22 to send the one or more accuracy reports to the analytics consumer based on the accuracy data.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for selecting a network function that can provide accuracy information. In some example embodiments, the profile may include accuracy information. In other example embodiments, the selection of the network function may be based at least on the accuracy information. The apparatus may also include means for sending a request to the network function for one or more accuracy reports for one or more analytics predictions. The apparatus may further include means for receiving the one or more accuracy reports from the network function. In addition, the apparatus may include means for managing the one or more analytics predictions based on the one or more accuracy reports.

Certain example embodiments may also be directed to an apparatus that includes means for receiving a request at a network function from an analytics consumer for one or more accuracy reports for one or more analytics predictions. The apparatus may also include means for obtaining accuracy data indicating an actual outcome of the one or more analytics predictions in response to the request. The apparatus may further include means for generating the one or more accuracy reports based on the accuracy data. In addition, the apparatus may include means for sending the one or more accuracy reports to the analytics consumer based on the accuracy data.

Certain example embodiments described herein provide several technical improvements, enhancements, and/or advantages. In some example embodiments, it may be possible to provide a way for an analytics consumer to retrieve an accuracy report related to the prediction or related to earlier predictions done for the same analytics type and model used. Additionally, knowledge of network analytics accuracy enabled by certain example embodiments may be used to increase network efficiency, improve coverage, identify and automatically handle anomalous behavior, scale resources to handle network load variations, detect and mitigate performance issues, and more.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary: | |
|---|---|
| 3GPP | 3rd Generation Partnership Project |
| 5G | 5th Generation |
| 5GCN | 5G Core Network |
| 5GS | 5G System |
| BS | Base Station |
| CN | Core Network |
| DL | Downlink |
| eNB | Enhanced Node B |
| GMLC | Gateway Mobile Location Center |
| gNB | 5G or Next Generation NodeB |
| LTE | Long Term Evolution |
| NFc | Network Function Consumer/network function (NF)/application function (AF)/operations, administration and maintenance (OAM) consuming analytics |
| NFp | Network Function Producer |
| NR | New Radio |
| NWDAF | Network Data Analytics Function |
| UE | User Equipment |
| UL | Uplink |

We claim:

1. An apparatus for a mobile telecommunications system, the apparatus comprising:
at least one processor; and
at least one memory storing instructions of a network function of the mobile telecommunications system, wherein the instructions, when executed by the at least one processor, cause the apparatus to perform operations, the operations comprising:
selecting a Network Data Analytics Function (NWDAF) of the telecommunications system that configured to provide analytics predictions and accuracy information for the analytics predictions;
sending, to the NWDAF, a request for one or more accuracy reports, wherein respective accuracy reports of the one or more accuracy reports comprise accuracy information indicating an accuracy of a prior analytics prediction generated by the NWDAF related to an actual outcome;
receiving, from the NWDAF, the one or more accuracy reports; and
managing a subscription for analytics predictions based on the one or more accuracy reports.

2. The apparatus according to claim 1, wherein the managing comprises managing use of analytics predictions.

3. The apparatus according to claim 1, wherein the operations further comprise:
sending an instruction to the NWDAF on how to handle the subscription.

4. The apparatus according to claim 1, wherein the request for the one or more accuracy reports comprises instructions specifying one or more conditions for the NWDAF to terminate the subscription for analytics predictions and stop sending the one or more accuracy reports, or to transfer the subscription for analytics predictions and to transfer the request for the one or more accuracy reports to another NWDAF.

5. The apparatus according to claim 4, wherein the one or more conditions comprise:
a number or a percentage of the one or more accuracy reports is above a threshold and the one or more accuracy reports comprise accuracy information indicating an accuracy that is below a threshold.

6. The apparatus according to claim 1, wherein the request to the NWDAF for the one or more accuracy reports further comprises a request for analytics predictions.

7. The apparatus according to claim 1, wherein the operations further comprise:
sending processing and filtering instructions to the NWDAF to combine or filter the one or more accuracy reports.

8. The apparatus according to claim 1, wherein the operations further comprise:
sending processing and filtering instructions to the NWDAF to control a frequency of sending the one or more accuracy reports.

9. The apparatus according to claim 1, wherein at least one of the one or more accuracy reports is an aggregated report comprising at least one of aggregated accuracy information of a plurality of subscriptions, and aggregated accuracy information based on a plurality of comparisons between prior predictions and an actual outcome related to a single subscription.

10. The apparatus according to claim 1, wherein the operations further comprise:
sending instructions to the NWDAF to stop sending analytics predictions and to terminate the subscription for analytics predictions after receiving a last accuracy report has been received, or to transfer the subscription for analytics predictions and to transfer the request for the one or more accuracy reports to another NWDAF.

11. An apparatus for a mobile telecommunications system, the apparatus comprising:

at least one processor; and at least one memory storing instructions of a Network Data Analytics Function (NWDAF) of the mobile telecommunications system, wherein the instructions, when executed by the at least one processor, cause the apparatus to perform operations, the operations comprising:

receiving, from an analytics consumer, a request for one or more accuracy reports;

obtaining, in response to the request, accuracy data indicating an accuracy of a prior analytics prediction generated by the NWDAF relative to actual outcome;

generating the one or more accuracy reports based on the accuracy data; and sending, to the analytics consumer, the one or more accuracy reports based on the accuracy data.

12. The apparatus of claim 11, further comprising:
managing a subscription for analytics predictions based on the one or more accuracy reports.

13. The apparatus according to claim 12, wherein the managing comprises managing use of the analytics predictions.

14. The apparatus according to claim 12, wherein the subscription for the analytics predictions is comprised in the request for the one or more accuracy reports.

15. The apparatus, according to claim 12, wherein the request for the one or more accuracy reports comprises instructions specifying one or more conditions to terminate the subscription for the analytics predictions and stop sending accuracy reports, or to transfer the subscription for the analytics predictions and to transfer the request for the one or more accuracy reports to another NWDAF.

16. The apparatus according to claim 15, wherein the one or more conditions comprise:
a number or a percentage of the one or more accuracy reports is above a threshold and the one or more accuracy reports comprise accuracy information indicating an accuracy that is below a threshold.

17. The apparatus according to claim 12, wherein the operation further comprise:
receiving instructions to stop sending analytics predictions and to terminate the subscription for the analytics predictions after a last accuracy report has been received, or to transfer the subscription for the analytics predictions and to transfer the request for the one or more accuracy reports to another NWDAF.

18. The apparatus according to claim 11, wherein the operation further comprise:
storing accuracy information based on the one or more accuracy reports in a profile of the NWDAF.

19. The apparatus according to claim 11, wherein the operations further comprise:
receiving processing and filtering instructions from the analytics consumer to combine or filter the one or more accuracy reports.

20. The apparatus according to claim 11, wherein the operations further comprise:
controlling a frequency of the one or more accuracy reports via a separate filtering or reporting instruction received in the request.

21. The apparatus according to claim 11, wherein the operations further comprise:
collecting data of actual outcomes related to analytics predictions; and
performing, with the collected data and predictions, self-improvement functions and machine learning operations.

22. The apparatus according to claim 11, wherein the operations further comprise:
re-training one or more models using the accuracy data.

* * * * *